United States Patent [19]

Bouley et al.

[11] Patent Number: 4,482,590

[45] Date of Patent: Nov. 13, 1984

[54] DEEP WATER FLOTATION DEVICES

[75] Inventors: Robert W. Bouley, East Springfield; Robert F. Kovar, Wrentham, both of Mass.

[73] Assignee: Syncom International, Inc., Agawam, Mass.

[21] Appl. No.: 521,597

[22] Filed: Aug. 9, 1983

[51] Int. Cl.³ ............................ B32B 3/26; B32B 5/16
[52] U.S. Cl. .................................. 428/35; 428/304.4; 428/313.5; 428/316.6; 428/327; 428/402
[58] Field of Search ................. 428/35, 402, 327, 407, 428/304.4, 313.5, 316.6

[56] References Cited

U.S. PATENT DOCUMENTS 3,622,437 11/1971 Hobaica et al. ..................... 428/35

Primary Examiner—Alexander S. Thomas
Attorney, Agent, or Firm—Kane, Dalsimer, Kane, Sullivan and Kurucz

[57] ABSTRACT

Novel macrospheres having improved resistance to implosion under hydrostatic pressure. The macrospheres are useful in buoyancy materials and devices.

6 Claims, 4 Drawing Figures

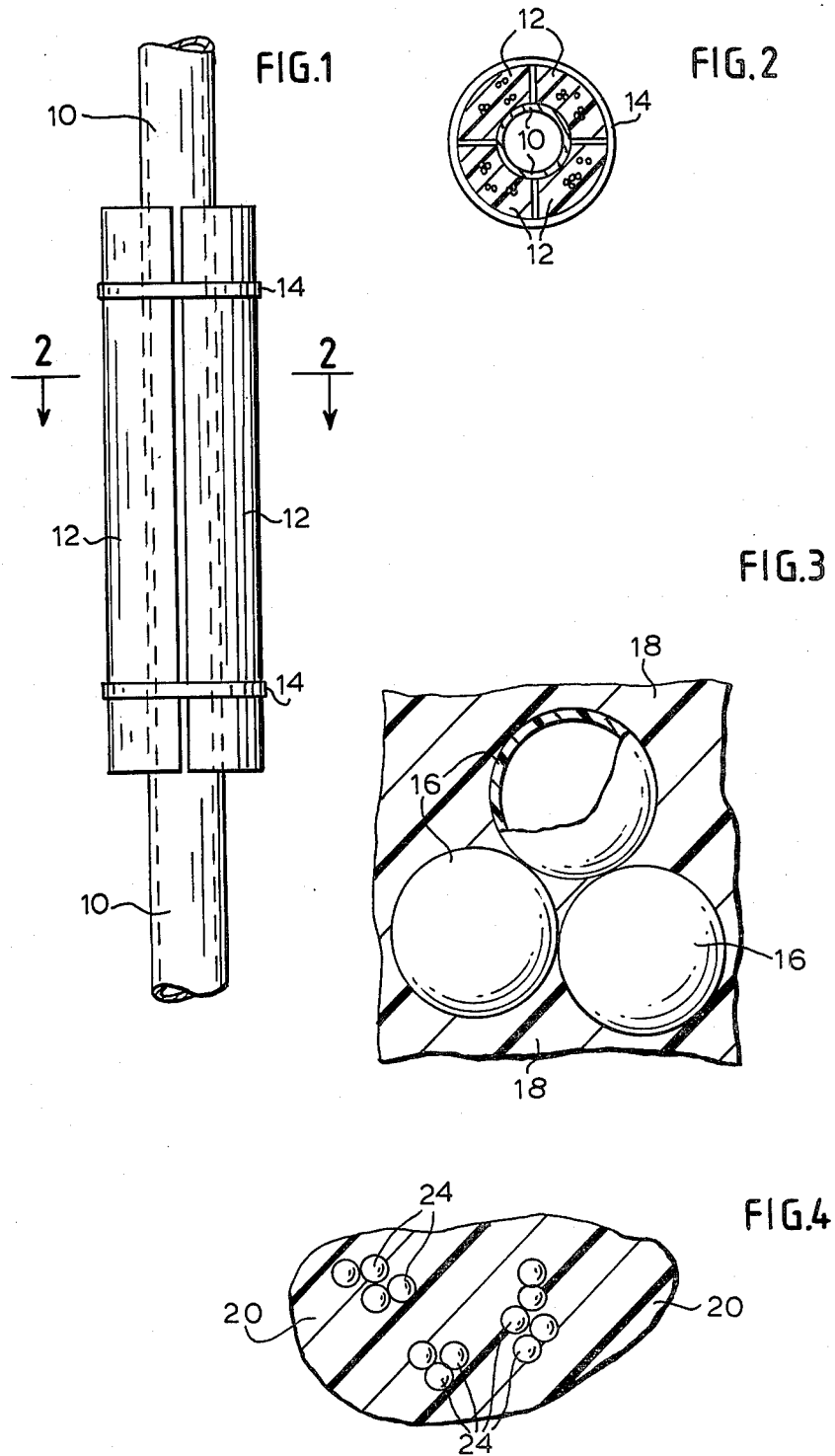

DEEP WATER FLOTATION DEVICES

BACKGROUND OF THE INVENTION

1. Field of the Invention

The invention relates to composite materials useful as buoyancy devices and more particularly relates to syntactic foam materials assembled to form deep water, submergible buoyance devices.

2. Brief Description of the Prior Art

Buoyancy devices have been assembled of syntactic foam compositions prior to the present invention; see for example the descriptions given in the U.S. Pat. Nos. 3,622,437 and 3,729,756. In general, such devices comprise a syntactic polymeric resin foam matrix incorporating a large volume of hollow spheres, designated as "macrospheres" to distinguish them from the smaller hollow spheres designated "microspheres" which constitute a component of the syntactic foam composition. The macrospheres generally have diameters of from 0.5 to 6 inches and are generally made of thermoplastic, synthetic, polymeric resins reinforced with filler materials such as mica and chopped fibers of glass. The prior art macrospheres employed generally have densities of from 7.5 to 12.5 lbs/cubic foot. When encapsulated in a conventional syntactic foam matrix, the implosion pressure limit of these macrospheres is approximately doubled, allowing for the buoyancy devices made of the macrosphere/foam compositions to be usefully employed at substantial depths in the open sea, i.e. at depths up to about 4,500 feet. At deeper sites there is a likelihood of macrosphere implosion due to the higher hydrostatic pressures associated with those depths.

We have now found that implosion resistant macrospheres for use in buoyancy devices at sea depths in excess of 4,500 feet and up to at least about 12,000 feet may be fabricated from syntactic foams, preferably made-up from synthetic thermosetting polymeric resins.

SUMMARY OF THE INVENTION

The invention comprises a macrosphere for use in a buoyancy device, which comprises; a hollow, closed sphere having a diameter of from about 0.5 to about 10 inches, a wall thickness of from about 0.010 to about 0.500 inches, a density of from about 6 to about 32 lbs/cubic foot, said sphere being fabricated from a hardened syntactic foam of a synthetic, polymeric resin.

The invention also comprises buoyancy materials and devices which include the macrospheres of the invention as a component thereof.

BRIEF DESCRIPTION OF THE DRAWINGS

FIG. 1 is a side elevational view of a section of conduit encased in a buoyancy device made up from a syntactic foam/macrosphere composition.

FIG. 2 is a view along lines 2—2 of FIG. 1.

FIG. 3 is an enlarged fragmentary view of a portion of the syntactic foam shown in FIG. 2.

FIG. 4 is a further enlarged, fragmentary view of the syntactic foam 18 in FIG. 3.

DETAILED DESCRIPTION OF THE PREFERRED EMBODIMENTS OF THE INVENTION

Referring to FIG. 1 of the accompanying drawings, there is seen a side elevational view of a section of conduit 10 encased within a jacket formed of a plurality of syntactic foam formed modules 12 held in place by bands 14. The modules 12 as shown in FIG. 2, a view along lines 2—2 of FIG. 1 comprise 90° sections. They could be of varied arc length, for example, up to 180°. The jacket made up of the four modules 12 is a buoyancy device for adding buoyancy to the attached conduit 10 in deep sea environments. The FIG. 3 is an enlarged, fragmentary view of the buoyancy material of which the modules 12 are formed. Thus, a syntactic foam 18 of a synthetic, polymeric resin serves as a matrix to bind together and encapsulate hollow, closed macrospheres 16 which are uniformly dispersed throughout the matrix foam 18. FIG. 4 is a greatly enlarged fragmentary view of the syntactic foam 18, showing that it is made up of a hardened, synthetic polymeric resin 20 loaded or filled with a plurality of microspheres 24, i.e.; a syntactic foam. Methods of manufacturing syntactic foams are well known; see for example U.S. Pat. Nos. 3,353,981; 3,230,184; and 3,622,437. In general, syntactic foams are hardened or cured synthetic, polymeric resins filled or loaded with hollow, closed microspheres, as defined by the ASTM Committee on Syntactic Foam. The microspheres act as fillers, but advantageously also reduce the overall density of the foam. The resin may be, for example, a polyester, phenolic or like resin. The microsphere filler materials are also well known and may be fabricated from glass, ceramic, polymeric resins and like materials; see U.S. Pat. Nos. 2,797,201 and 3,133,821. Preferred microsphere components of the syntactic foam matrices employed in the present invention are represented by the commercially available "Glass Bubbles" (3M Corporation, St. Paul, Minn.). Generally such microspheres have diameters of 5 to 500 microns.

The proportion of microspheres or other fillers may constitute from 50 to 75 percent by volume of the resin foam composition, i.e. the syntactic foam.

Methods of forming buoyancy articles and devices by encapsulating macrospheres in the matrix of a syntactic foam are well known to those skilled in the art and need not be described in detail herein; see for example the methods described in U.S. Pat. Nos. 3,729,756; 3,622,437; 3,996,654; and 4,021,589. In the present invention, the macrospheres encapsulated are of a specific and novel construction. They are employed to reduce the overall weight of the buoyancy device, without a sacrifice of strength, particularly resistance to implosion under deep water submergence conditions (hydrostatic pressure). Preferably, low density macrospheres are desired to give maximum bouyancy to the buoyancy device of which the macrosphere becomes a component. Advantageously the density of the macrospheres of the invention lie within the range of from about 0.15 to about 0.45 gms/cubic centimeter; preferably 0.22 to 0.33 gms/cc.

A wide range of synthetic, polymeric resins may be used to prepare the resin component of the syntactic foams employed in the fabrication of the macrospheres of the invention. Representative of such resins are polyurethanes, polyesters, polyepoxides and like resins. Copolymer resins such as styreneacrylonitrile and the like may also be used. The polyester resins such as those described in the U.S. Pat. No. 4,104,357 are advantageous. Preferred for fabricating the macrospheres of the invention are thermoseting resins, which appear to enhance the compressive strength of the macrosphere product over thermoplastic resins. Particularly advantageous in this respect are the thermosetting polyvinyl ester resins of the general formula:

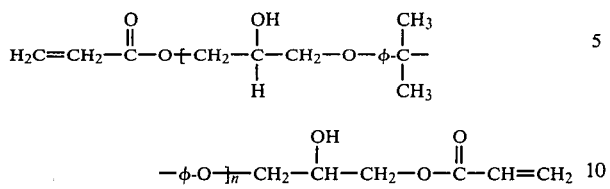

wherein n is an integer of such value that the resin has an average molecular weight starting from 485 and up. Such resins are commercially available and are represented for example by Corrolite 31-345 (Reichhold Chemical Inc., White Plains, N.Y.

The syntactic foams employed in the fabrication of the macrospheres of the invention may contain the same fillers described above for the foam matrix, i.e. microspheres of glass, ceramic or polymeric resin materials. In their preparation, a curable syntactic foam forming composition is made by admixture of a curable resin with from 20 to 80 percent by volume of fillers. The resin component is then cured, generally with a curing agent to obtain the syntactic foam. Preferably, the resin is a polyepoxide and the curing agent an organic amine.

Polyamine agents for curing polyepoxides are well known as is the method of their preparation. Representative of such agents are those of the formula:

$$H_2N + R - NH +_n H$$

wherein R represents hydrocarbylene and n is an integer of from 1-5.

The term "hydrocarbylene" as used herein means the divalent moiety obtained upon removal of a hydrogen atom from a hydrocarbyl radical as previously defined.

Representative of polyamine curing agents of the formula given above are ethylene diamine, diethylene triamine, diethyleneaminopropylamine, m-phenylenediamine, p-phenylenediamine, methylenedianiline, triethylene tetramine, tetraethylene pentamine and the like.

Additional ingredients may be added to the foam forming compositions as is conventional in the art. Representative of such additional ingredients are inert solvents for the epoxide reactant, inert fillers and reinforcing materials such as textile fibers and the like, impact resistance modifiers such as vinyl terminated butadiene/acrylonitrile copolymers, bonding or coupling agents such as silanes to improve the bond between glass microspheres and the resin matrix, flame retardants such as potassium and antimony salts, catalysts and promotors for curing the resins and the like.

The macrospheres of the invention may be manufactured from the above-described syntactic foam-forming compositions by conventional and known molding techniques. One technique would comprise the injection molding of two halves or hemispheres from the syntactic foam-forming composition and sealing the halves together to complete the macrospheres. An advantageous molding technique is to rotary mold the entire sphere so as to obtain a seamless, one-piece macrosphere in the form of a complete sphere. In general, the macrospheres are fabricated with a wall thickness of from about 22 to about 52 mm.

The following examples describe the manner and process of making and using the invention and set forth the best mode contemplated by the inventors for carrying out the invention but are not to be considered as limiting the scope of the invention. All parts are by weight unless otherwise specified. All specified test results, where given, were according to the following procedures.

Compressive strength and compressive modulus tests were performed according to the ASTM procedure D-695.

Flexural strength tests were performed by using the formula:

$$\text{Flexural Strength} = \frac{8PL}{\pi D^3}$$

where D=diameter, P=Load and L=Span.

Rapid Loading Burst Strength tests were carried out by Isostatic Press, rate of hydrostatic pressurization between 500–1200 pounds per square inch per second, preferably between 600–900 psi/sec. Long term Hydrostatic Creep Performance was determined by continuous hydrostatic exposure at design pressure required.

Sympathetic Implosion tests were conducted by casting three spheres in syntactic foam, one sphere underdesigned for short-term testing at design test pressure.

EXAMPLE 1

An appropriate vessel was charged with 100 parts of a polyester resin (Polylite 31-001; Reichhold Chemicals, Inc., supra). To the charge there was added with stirring 15 parts of 3M Glass Bubbles (B38/4000) having a density of 0.38 gms/cc, and 0.375 parts of a silane coupling agent (Z-6030, Petrarch Chemical Co.). To the resulting mixture there was added with mixing 1 part of 60% methyl ethyl ketone peroxide, 1 part of 6% cobalt naphthenate and 1.5 parts of dimethylaniline. The resulting mixture was injected into a rotary molding apparatus to mold spheres with a diameter of 2.47 inches and an average wall thickness of 0.090–0.200 inch range. Representative spheres so molded were then subjected to physical testing. The test results are set forth in the following table.

EXAMPLE 2

The procedure of Example 1, supra., was repeated except that the proportion of glass bubbles as used therein was reduced to 7.5 parts. The test results are given in the following table.

TABLE I

| Rapid Loading Burst Strength Results (Sphere weight in grams, yielding designated burst pressures) | | |
|---|---|---|
| Burst Pressure | Composition | |
| PSI | Example 1 | Example 2 |
| 1500 | | 24.9 |
| 1600 | 22.8  23.3 | |
| 1700 | | |
| 1800 | | |
| 1850 | | 25.9 |
| 1900 | | |
| 2000 | | |
| 2100 | | |
| 2200 | | |
| 2300 | | |
| 2400 | | |
| 2500 | 26.2  28.1 | 27.4 |
| 2550 | | |

TABLE I-continued

Rapid Loading Burst Strength Results
(Sphere weight in grams, yielding designated burst pressures)

| Burst Pressure PSI | Composition Example 1 | | Example 2 |
|---|---|---|---|
| 2600 | 28.0 | | 28.5 |
| 2700 | | | |
| 2800 | 29.6 | 27.7 | 29.4 |

Long Term Hydrostatic Creep Performance

| Formulation | Pressure psi | Time (Days) | % Survivors |
|---|---|---|---|
| Example 1 | 750 | 5 | 80 |
| Example 2 | 750 | 5 | 100 |
| Example 1 | 1100 | 5 | 100 |
| Example 2 | 1100 | 5 | 100 |

Mechanical Properties of Sphere Material Compositions

| | Example 1 | Example 2 |
|---|---|---|
| Uniaxial Compressive Strength psi | 18200 | 20100 |
| Uniaxial Compressive Modulus psi ($\times 10^5$) | 5.26 | 5.53 |
| Flexural Strength | 4900 | 5600 |

Sympathetic Implosion Test Results

| Composition | Design Pressure, psi | Sphere Weights, g. | Results |
|---|---|---|---|
| Example 1 | 750 | 23.3 | no implosion |
| | | 25.2 | propagation |
| | | 27.2 | |
| Example 2 | 750 | 25.0 | no implosion |
| | | 26.1 | propagation |
| | | 28.1 | |
| Example 1 | 1100* | 29.2 | no implosion |
| | | 30.6 | propagation |
| | | 31.3 | |
| Example 2 | 1100 | 29.1 | no implosion |
| | | 31.2 | propagation |
| | | 31.3 | |

EXAMPLE 3

A riser (buoyancy) module was prepared, encapsulating macrospheres prepared in accordance with the procedure of Example 1, supra., in a syntactic polyepoxide foam matrix. The module, identified by the serial number 5212-1 was then subjected to hydrostatic testing as follows:

| Test performed: | Buoyancy loss of module as manufactured, over a period of 210 hours at 3340 psig. Buoyancy loss of the module was monitored continuously throughout the duration of the test. |
|---|---|
| Procedure: | The riser module was "suspended in the test chamber by three stainless steel springs each having a spring constant of 5 lbs. per inch". A Bourn's Model 108 0-5000 OHM, Linear Displacement Transducer with a maximum travel of four inches was used to continuously measure the extention of the spring as the module absorbed water. The resulting output signal from the transducer was monitored on a Hewlett package model No. 3465B digital multimeter. A Heise 0-5000 psig pressure gage and a CEC pressure transducer model No. 402 with digital readout were used to monitor test chamber. The pressure chamber used was a 90-inch I.D., 4000 psig test chamber. Hydrostatic pressure test was performed using fresh water at ambient temperature. |
| 210 Hour Hydrostatic Test: | Test chamber pressure was increased to approximately 50 psig and maintained at this level for 8 hours. The test chamber pressure was then increased to 3340 psig in 100 psig increments every 15 minutes and maintained at this level for approximately 210 hours. At 3340 psig, the module showed 1.39 percent loss of original calculated buoyancy or a total of 9.17 pounds loss. Upon completion of the 210 hour hold period, module 5212-1 showed a total of 2.36 percent buoyancy loss (15.57) lbs. The module was left in the test chamber at 0 psig from 2015 hours, through 0800 hours, four days later before being removed. Upon removal of the module from the test chamber, the steel ballast was removed and the module weight in air was recorded. There was no major damage to the module observed and the total weight gain of the module was 4.25 pounds. |

SUMMARY OF DATA

TEST DATA

| Wt. in air before test | 865.75 lbs. |
|---|---|
| Total steel ballast | 771.5 lbs. |
| Negative buoyancy (measured) | −13.0 lbs. |
| Initial buoyancy (calculated) | 661.29 lbs. |
| Spring rate | 5 lbs./inch |
| Displacement rate | .012 lbs./OHM |
| Wt. in air after test | 870 lbs |
| Wt. gain | 4.25 lbs |

The results of the hydrostatic testing indicate that the module identified as 5212-1 met or exceeded the test requirements identified. The percentage weight gain 0.49% after 210 hours was within acceptable levels.

What is claimed:

1. A macrosphere for use in a buoyancy device, which comprises; a hollow, closed sphere having a diameter of from about 0.5 to about 10 inches, a wall thickness of from about 0.010 to about 0.500 inches, a density of from about 6 to about 32 lbs/cubic foot, said sphere being fabricated from a hardened syntactic foam of a synthetic, polymeric resin.

2. The macrosphere of claim 1 wherein said sphere is a one-piece, seamless sphere.

3. The macrosphere of claim 1 wherein said resin is a polyepoxide resin.

4. The macrosphere of claim 3 wherein said resin is a thermosetting resin.

5. A buoyancy material, which comprises a plurality of the macrospheres of claim 1 encapsulated in a syntactic foam resin matrix, said material having a total specific gravity of less than 1.

6. A buoyancy device molded of the material of claim 5.

* * * * *